United States Patent
Fitzgerald

(10) Patent No.: US 7,197,567 B1
(45) Date of Patent: Mar. 27, 2007

(54) DEVICES, SOFTWARES AND METHODS FOR ENABLING SIP DEVICES TO OPERATE IN H.323 NETWORKS AND H.323 DEVICES TO OPERATE IN SIP NETWORKS

(75) Inventor: Cary Fitzgerald, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 531 days.

(21) Appl. No.: 10/086,840

(22) Filed: Feb. 28, 2002

(51) Int. Cl.
G06F 13/14 (2006.01)
H04L 12/56 (2006.01)

(52) U.S. Cl. .............. 709/227; 709/225; 370/395.2; 370/467; 370/331; 710/12; 710/62; 710/63; 710/64; 379/89; 379/93.15

(58) Field of Classification Search ........ 709/204–207, 709/227–228, 238, 249; 370/230, 352, 331, 370/338, 466; 710/20, 36, 52, 62, 104, 129; 379/89, 93.15
See application file for complete search history.

(56) References Cited

U.S. PATENT DOCUMENTS

| | | | |
|---|---|---|---|
| 6,456,594 B1 * | 9/2002 | Kaplan et al. | 370/238 |
| 6,470,399 B1 * | 10/2002 | Tasler | 710/16 |
| 6,577,622 B1 * | 6/2003 | Schuster et al. | 370/352 |
| 6,625,170 B1 * | 9/2003 | Curry et al. | 370/467 |
| 6,751,652 B1 * | 6/2004 | Thomas | 709/204 |
| 6,765,912 B1 * | 7/2004 | Vuong | 370/395.2 |
| 6,788,660 B1 * | 9/2004 | Agrawal et al. | 370/331 |
| 6,965,614 B1 * | 11/2005 | Osterhout et al. | 370/466 |
| 7,002,989 B2 * | 2/2006 | Agrawal et al. | 370/467 |

* cited by examiner

Primary Examiner—David Wiley
Assistant Examiner—Jude Jean-Gilles
(74) Attorney, Agent, or Firm—Marger Johnson & McCollom, PC

(57) ABSTRACT

Devices, softwares and methods enable SIP devices to operate in H.323 networks, and devices, softwares and methods enable H.323 devices to operate in SIP networks. Messages that initiate communication from a first protocol are translated into the appropriate messages of the second, responded to, and the replies are translated back into the first. Routing by the legacy network is thus seamlessly exploited.

36 Claims, 6 Drawing Sheets

DEVICES, SOFTWARES AND METHODS FOR ENABLING SIP DEVICES TO OPERATE IN H.323 NETWORKS AND H.323 DEVICES TO OPERATE IN SIP NETWORKS

BACKGROUND OF THE INVENTION

1. Field of the Invention

The present invention is related to the field of packet networks, and more specifically to devices, softwares and methods for enabling devices to operate in networks of diverse protocols.

2. Description of the Related Art

Packet networks are increasingly used for communications. Such communications include data, and also voice for packet telephony, and so on.

Each network transmits information in packets, according to a certain protocol. Packet telephony, for example, may take place under a Voice over Internet Protocol (VoIP).

The protocol is so important that networks, devices, and even messages are often labeled by their protocol. One well established such protocol is the H.323 of the IETF (Internet Engineering Task Force). Networks that operate under this protocol are therefore often called H.323 networks, and so on.

A problem arises when components are developed that operate under a different protocol. One such protocol that is gaining increasing acceptance is the Session Initiation Protocol (SIP). Devices that use the SIP protocol are called SIP devices.

Components of a newer protocol are typically not usable in networks of an older protocol. This is a problem when a large ("legacy") infrastructure has been installed according to the older protocol. For example, SIP devices are not usable with H.323 networks, and H.323 devices are not usable with SIP networks.

Referring to FIG. 1, one facet of the problem is described. A H.323 packet network 110 has a CSR Gatekeeper 120, a directory gatekeeper 130, and a device with a memory 140 that has configured routes stored therein.

A gatekeeper is the "switch" of the network, providing several basic services to all endpoints in its zone. Services include address translation (alias name/number-to-network address), endpoint admission control (based on bandwidth availability, concurrent call limitations, or registration privileges), bandwidth management, and zone management (the routing of calls originating or terminating in the gatekeeper zone—including multiple path re-route). Additional gatekeepers (not shown) may or may not be provided in a cluster according to the invention.

A routing application 150 runs on CSR Gatekeeper 120. Network 110 may also have one or more dynamic protocol devices 162, 164. These run dynamic protocols, such as Telephony Routing over IP (TRIP), or H.323 Annex G Protocols. Network 110 is accessed via a H.323 gatekeeper 170 as follows. A first H.323 endpoint 180 accesses H.323 gatekeeper 170, and then communicates address information to a second H.323 endpoint 190. These and other devices of network 110 may be connected to the PSTN (Public Switched Telephone Network), to an ISDN (Integrated Services Data Network), etc.

With a network such as network 110 customers may implement arbitrary routing applications, using configured gatekeepers, networks of directory gatekeepers, carrier-sensitive routing, other means, or combinations of the above.

The problem with H.323 network 110 is that it can not be accessed by a SIP device.

Referring to FIG. 2, another facet of the problem is described. A SIP packet network 210 has a CSR proxy 220, a proxy 230, and a proxy 240 that has configured routes stored therein. A routing application 250 runs on CSR proxy 220. Network 210 may also have one or more dynamic protocol devices 262, 264, that run on suitable dynamic protocols.

Network 210 is accessed via a SIP gatekeeper 270 as follows. A first SIP User Agent (UA) 280 accesses SIP gatekeeper 270, and then communicates address information to a second SIP UA 290. A SIP UA may be SIP IP telephone, or POTS/SIP IP media gateway. ("POTS" stands for Plain Old Telephone System.)

Other terminology for SIP is found in a website which, at the time this document is initially filed with the U.S. Patent Office, has a URL of <http://www.cs.columbia.ed/~hgs/sip>.

The problem with SIP network 210 is that it can not be accessed by a H.323 endpoint device.

BRIEF SUMMARY OF THE INVENTION

The present invention overcomes these problems and limitations of the prior art.

Generally, the present invention provides devices, softwares and methods for enabling SIP devices to operate in H.323 networks, and the same for H.323 devices in SIP networks. Messages that initiate communication from one protocol are translated into the other, responded to, and the replies are translated back. Routing by the legacy network is thus seamlessly exploited. Upgraded devices may be used with the legacy network, without the need of a network upgrade.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, softwares and methods for enabling SIP devices to operate in H.323 networks, and conversely for enabling H.323 devices to operate in SIP networks. The invention is now described in more detail.

Figure 3:
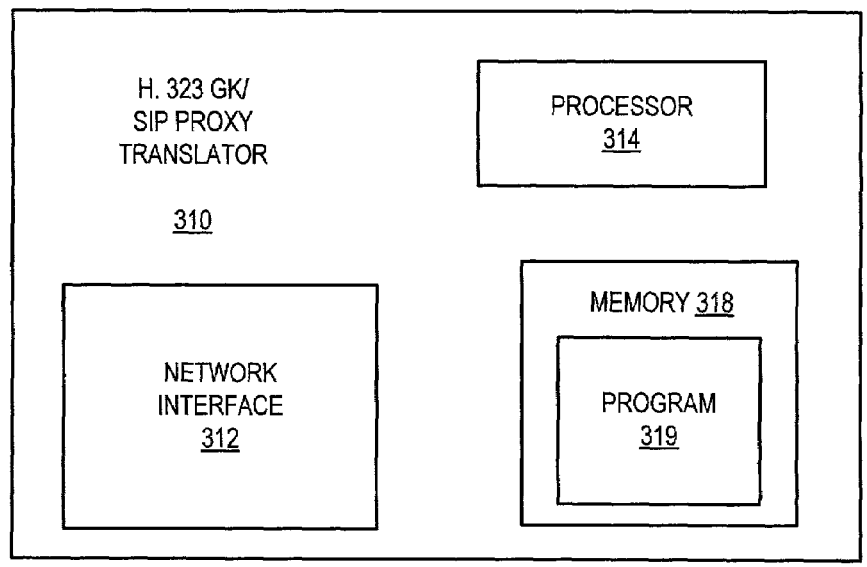
FIG. 3 is a block diagram of a H.323 proxy server ma de according to an embodiment of the present invention.

Referring now to FIG. 3, a network switch 310 made according to an embodiment of the invention is described in more detail. Switch 310 may be any H.323 network switch, such as a router, a gateway, a bridge, etc. Or it can be a farm of interconnected switches. Switch 310 is a combined H.323 gatekeeper and SIP Proxy Translator.

Figure 1:
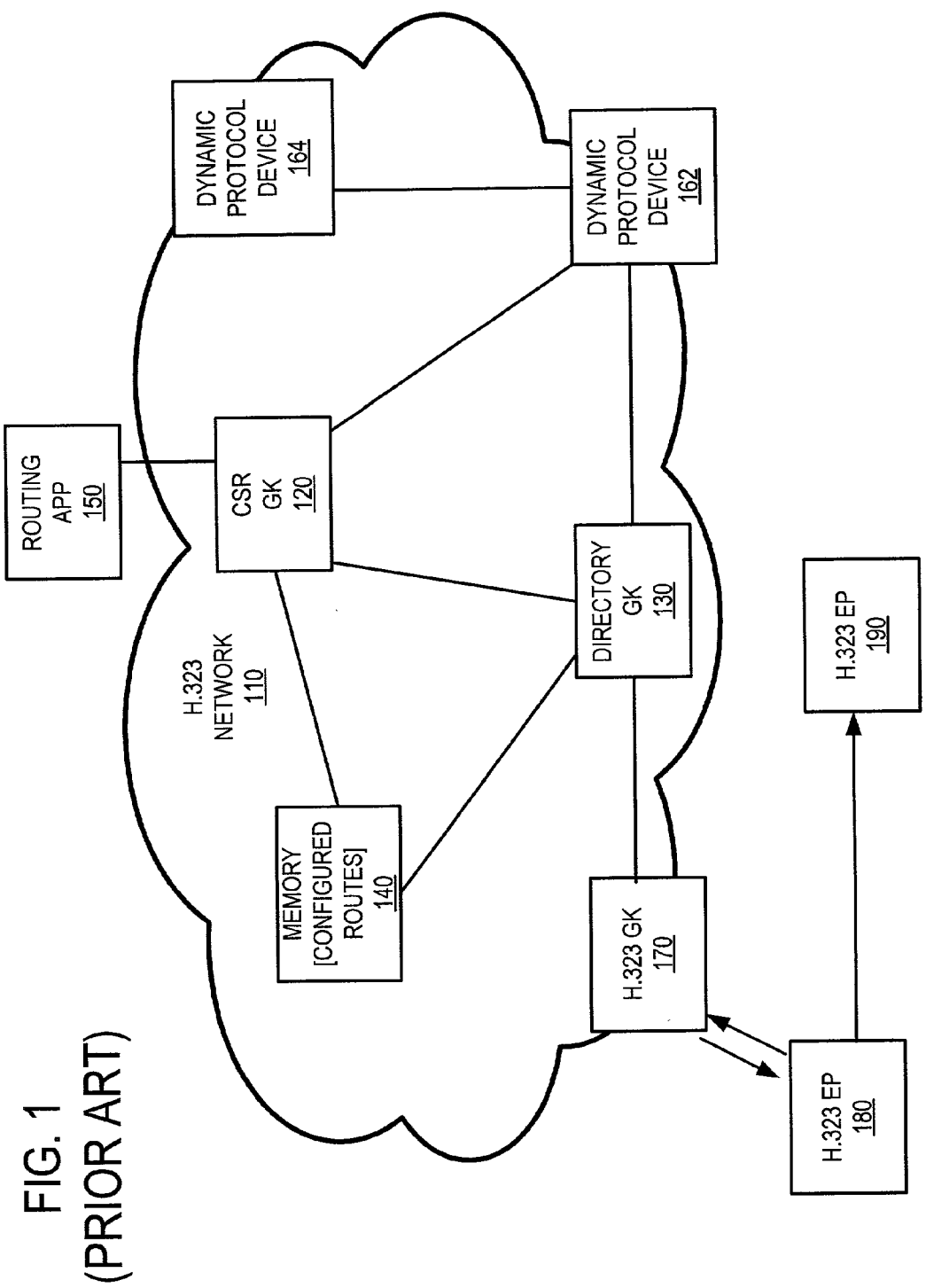
FIG. 1 is a H.323 network diagram in the prior art.

Switch 310 has a network interface 312 for interfacing with a H.323 network, such as network 110 of FIG. 1. In fact, it may interoperate with such a network without the latter perceiving any incompatibility. Switch 310 may also communicate with SIP devices, such as a SIP User Agent (UA).

Switch 310 also has a processor 314 coupled with network interface 312. Processor 314 may be implemented as a Digital Signal Processor (DSP), Central Processing Unit (CPU), or any other equivalent way known in the art.

Switch 310 additionally includes a memory 318, on which a program 319 may reside. Functions of processor 314 may be controlled by program 319, as will become apparent from the below.

Figure 4:
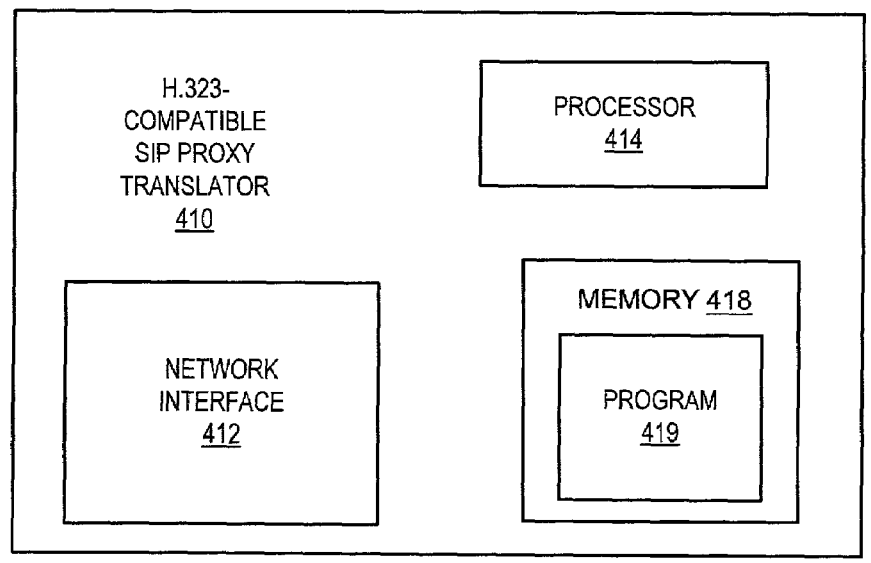
FIG. 4 is a block diagram of a SIP proxy server made according to an embodiment of the present invention.

Referring now to FIG. 4, a network switch 410 made according to an embodiment of the invention is described in more detail. Switch 410 may be any SIP network switch, such as a proxy server, a router, a gateway, a bridge, etc. Or switch 410 may be implemented by a farm, in other words a group of (proxy) servers that are configured to work together, so that they behave as a single server. Switch 410 is a H.323—Compatible SIP Proxy Translator.

Figure 2:
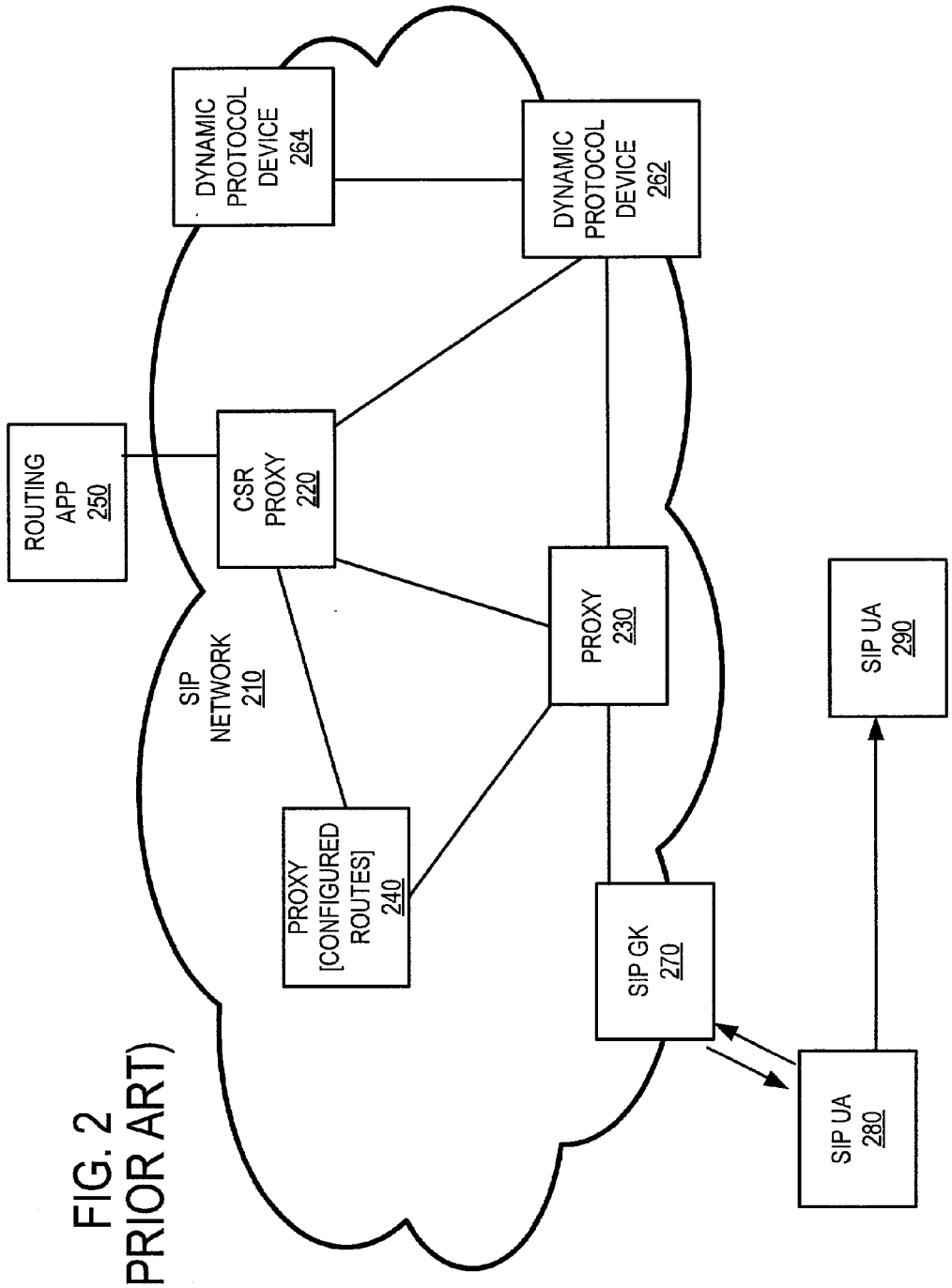
FIG. 2 is a SIP network diagram in the prior art.

Switch 410 has a network interface 412 for interfacing with a SIP network, such as network 210 of FIG. 2. In fact, it may interoperate with such a network without the latter perceiving any incompatibility. Switch 410 may also communicate with H.323 endpoint devices.

Switch 410 also has a processor 414 coupled with network interface 412. Processor 414 may be implemented as a Digital Signal Processor (DSP), Central Processing Unit (CPU), or any other equivalent way known in the art.

Switch 410 additionally includes a memory 418, on which a program 419 may reside. Functions of processor 414 may be controlled by program 419, as will become apparent from the below.

As seen from the above, the present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Figure 5:
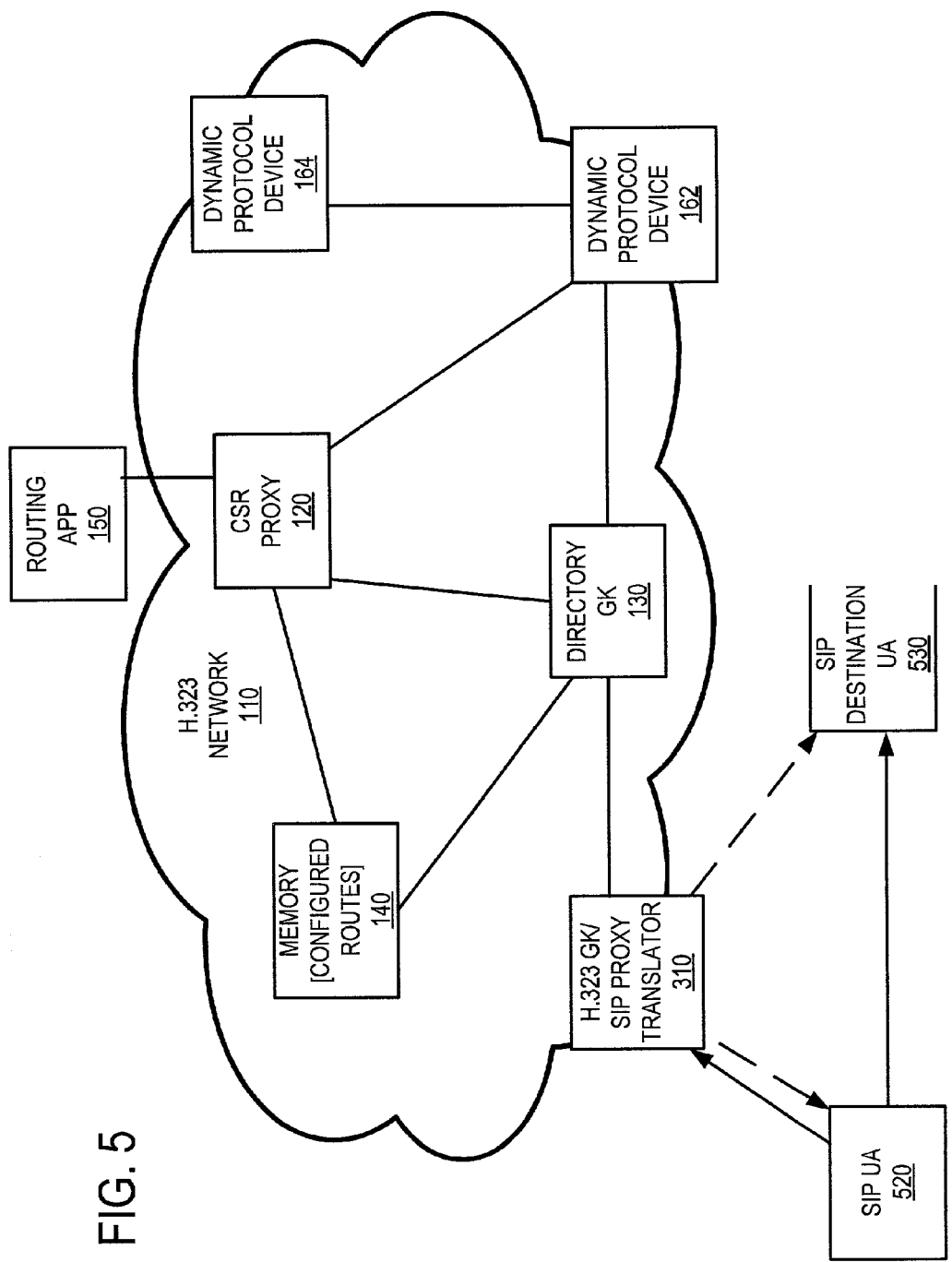
FIG. 5 is a network diagram illustrating a use of the H.323 proxy server of FIG. 3.

Referring now to FIG. 5, an arrangement is described for using switch 310 of FIG. 3. It will be appreciated that switch 310 has been used in H.323 network 110 of FIG. 1, by replacing H.323 Gatekeeper 170.

A SIP User Agent (UA) 520 can access switch 310, on behalf of SIP destination UA 530. This way SIP destination UA 530 can use H.323 network 110. And this without having to upgrade or change the remainder of H.323 packet network 110, or with network 110 knowing that it is facilitating a non-H.323 device.

Figure 6:
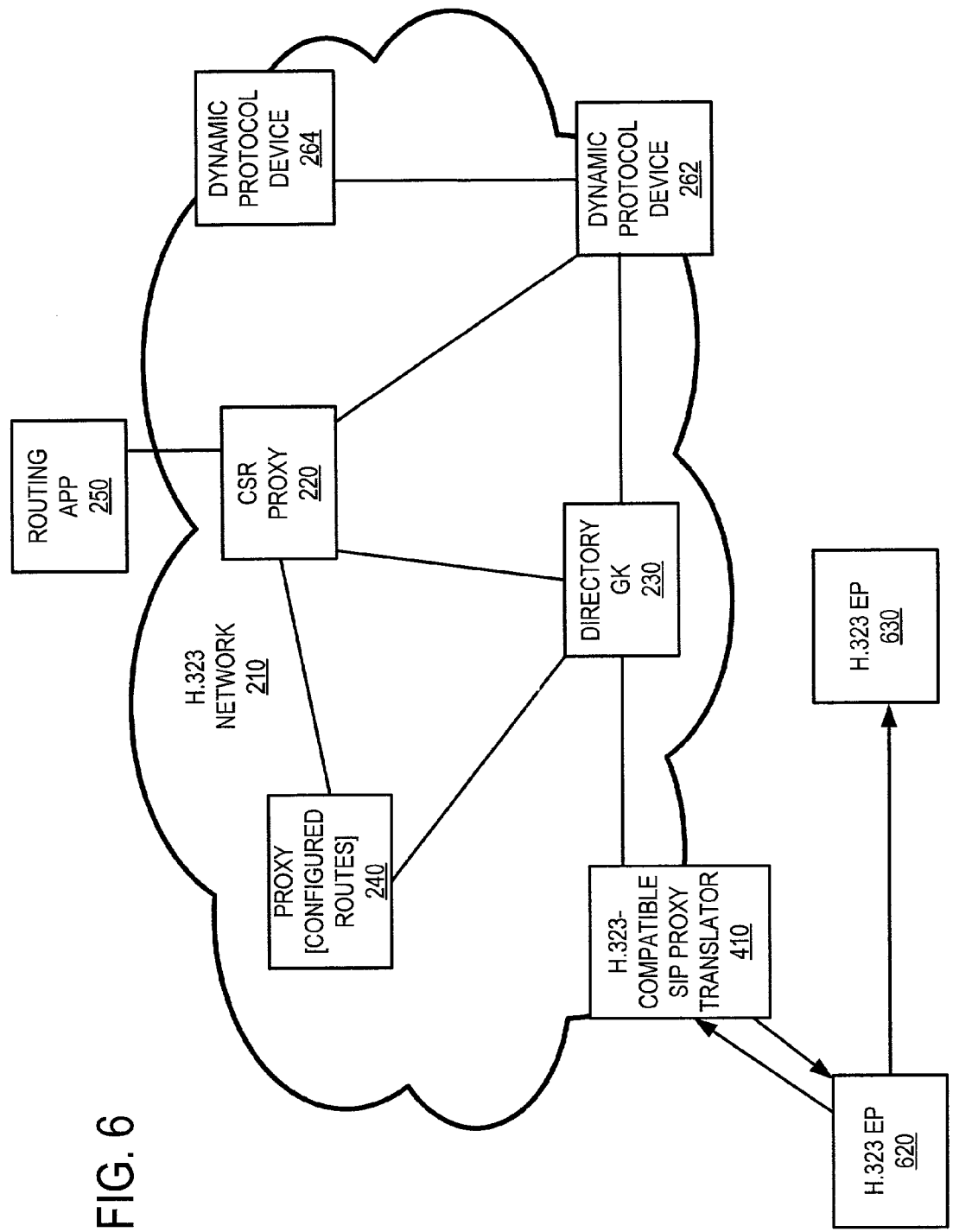
FIG. 6 is a network diagram illustrating a use of the SIP proxy server of FIG. 4.

Referring now to FIG. 6, an arrangement is described for using switch 410 of FIG. 4. It will be appreciated that switch 410 has been used in SIP network 210 of FIG. 2, by replacing SIP Gatekeeper 270.

A first H.323 endpoint (EP) 620 can access switch 410, on behalf of a second H.323 endpoint (EP) 630. This way second H.323 endpoint (EP) 630 can use SIP network 210. And this without having to upgrade or change the remainder of SIP packet network 210, or with network 210 knowing that it is facilitating a non-SIP device.

Figure 7:
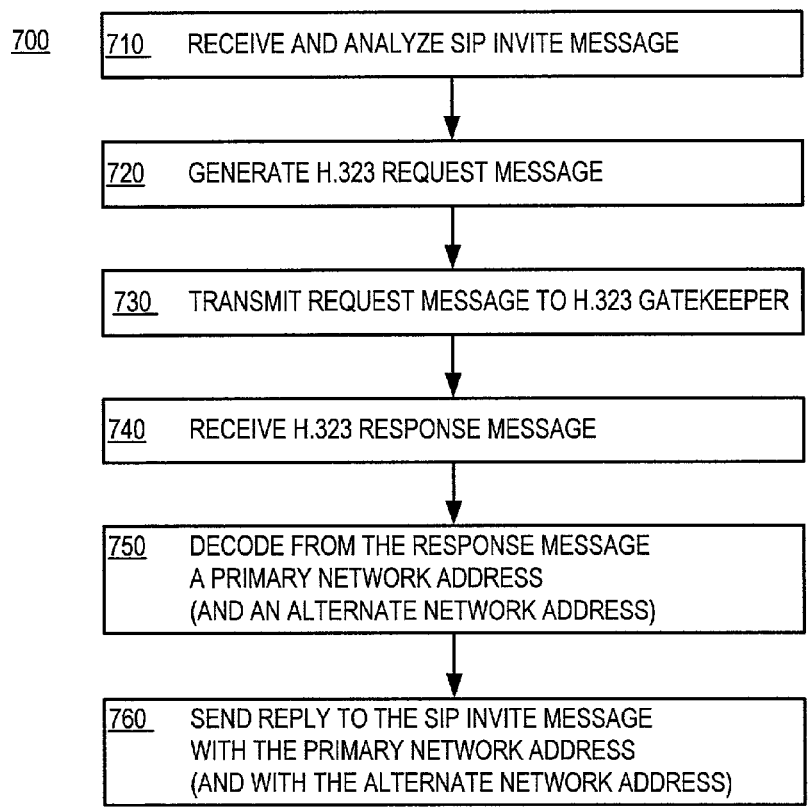
FIG. 7 is a flowchart illustrating a method according to an embodiment of the present invention.

Referring now to FIG. 7, a flowchart 700 is used to illustrate a method according to an embodiment of the invention. The method of flowchart 700 may also be practiced by network switch 310 of FIG. 3.

According to a box 710, a SIP invite message is received and analyzed from SIP UA 520. A SIP invite message is a message as per the SIP protocol.

According to a next box 720, a H.323 request message is generated. The request message is generated responsive to the analyzed SIP invite message. It is, in a sense, a translation.

The request message may be a ASN.1 encoded RAS LRQ message. RAS is Registration, Admission, and Status (including bandwidth changes) between H.323 entities and the relevant Gatekeeper. RAS is defined in standard H.225. LRQ is a Location Request message. "ASN" stands for Abstract Syntax Notation, and ASN.1 is defined in reference with H.323 gatekeepers.

According to a next box 730, the generated request message is transmitted to a gatekeeper, such as H.323 directory gatekeeper 130. In some instances, the gatekeeper is preconfigured, and the request message is transmitted over a UDP socket, although that is not necessary for practicing the invention.

A primary network device of network 110 is then selected. The primary network device is identified by its network address. Optionally, an alternate network device may also be selected, identified by its network address. In both cases, selection takes place as is known in the art for H.323 networks, and further description is therefore omitted as superfluous.

According to a next box 740, a H.323 response message is received responsive to the transmitted request message. The response message may be a ASN.1 encoded RAS LCF (Location Confirm) message. Or it may be a LRJ (Location Reject) message, or a RIP (Routing Information Protocol) message.

The response message may be received from the same gatekeeper of the H.323 network 110 that the request message was transmitted to. That is not necessary, however, for practicing the invention. The response message may be received from another device, with a proper arrangement. The other device may be a related gatekeeper, although that is not necessary for practicing the invention. The related gatekeeper may be one in a cluster with the one that the request message was transmitted to.

According to a next box 750, a primary network address is decoded from the response message. The primary network address corresponds to the selected primary device of network 110.

Optionally, an alternate network address is also decoded from the response message. The alternate network address corresponds to the alternate selected device of network 110.

According to a next box 760, a reply is sent to the SIP invite message. The reply contains the primary network address. If an alternate network address has also been supplied, the reply contains also the alternate network address.

The reply is in SIP terms. In one embodiment, the reply is sent to the device that sent the SIP invite message (e.g. SIP UA 520 of FIG. 5). Then that device may launch a new SIP invite based on the translated request.

In another embodiment, the reply is sent to another device. For example the reply may be to divert the SIP message to SIP UA 530 of FIG. 5.

Figure 8:
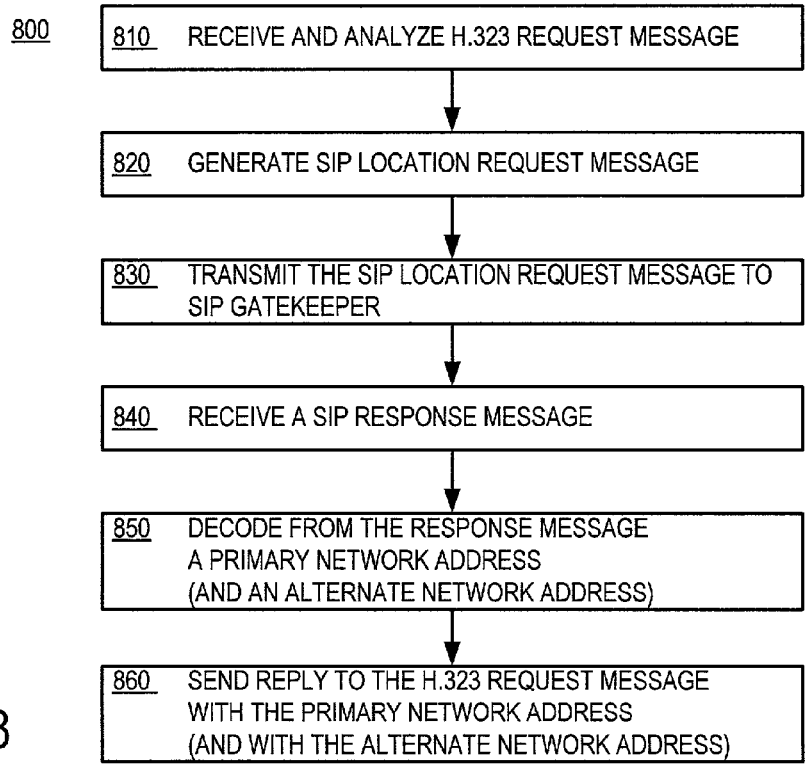
FIG. 8 is a flowchart illustrating a method according to another embodiment of the present invention.

Referring now to FIG. 8, a flowchart 800 is used to illustrate a method according to another embodiment of the invention. The method of flowchart 800 may also be practiced by device 410 of FIG. 4.

According to a box 810, a H.323 request message is received and analyzed. The request message may be a ASN.1 encoded RAS LRQ message, and may be received from first H.323 EP 620.

According to a next box 820, a SIP location request message is generated responsive to the analyzed H.323 request message. The SIP location request message is in a sense a translation.

According to a next box 830, the generated SIP location request message is transmitted to a gatekeeper, such as directory gatekeeper 230. The gatekeeper may be preconfigured, and the SIP location request message may be transmitted over a UDP socket.

A primary device of network 210, is then selected. The primary network device is identified by its network address. Optionally, an alternate network device may also be selected, identified by its network address. In both cases, selection takes place as is known in the art for H.323 networks, and further description is therefore omitted as superfluous.

According to a next box 840, a SIP response message is received responsive to the transmitted SIP location request message. The response message may be received from the same gatekeeper of network 210 that the request message was transmitted to. That is not necessary, however, for practicing the invention. The response message may be received from another device, with a proper arrangement. The other device may be a related gatekeeper, although that is not necessary for practicing the invention. The related gatekeeper may be one in a cluster with the one that the request message was transmitted to.

According to a next box 850, a primary network address is decoded from the response message. The primary network address corresponds to the selected primary network device.

Optionally, an alternate network address is also decoded from the response message. The alternate network address corresponds to the selected alternate network device.

According to a next box 860, a reply is sent to the H.323 request message. The reply is in H.323 terms. The reply contains the primary network address. If an alternate network address has also been supplied, the reply contains also the alternate network address.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties a disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A device comprising:
a network interface for coupling a network device using a second packet signaling protocol to a network using a first packet signaling protocol; and
a processor coupled with the network interface, in which the processor is adapted to
receive and analyze a message to initiate communications from the network device using the second packet signaling protocol with the network using the first packet signaling protocol;
convert the message received in the second packet signaling protocol to a message in the first packet signaling protocol;
transmit the message converted to the first packet signaling protocol to a network gatekeeper;
receive a response message in the first packet signaling protocol responsive to the message converted to the first packet signaling protocol and transmitted to the network gatekeeper;
decode from the response message received in the first packet signaling protocol a primary network address corresponding to a primary network device associated with the gatekeeper;
convert the response message received in the first packet signaling protocol to a reply message in the second packet signaling protocol; and
send the reply message in the second packet signaling protocol that contains the primary network address.

2. The device of claim 1, wherein
the first packet signaling protocol comprises H.323 protocol,
the second packet signaling protocol comprises Session Initiation Protocol (SIP),
the message received in the second packet signaling protocol comprises a SIP invite message to initiate communications with a network device associated with the gatekeeper, and
the message in the first packet signaling protocol comprises an H.323 request message.

3. The device of claim 1, wherein
the first packet signaling protocol comprises SIP,
the second packet signaling protocol comprises H.323 protocol,
the message received in the second packet signaling protocol-comprises an H.323 request message to initiate communications with a network device associated with the gatekeeper, and
the message in the first packet signaling protocol comprises a SIP invite message.

4. The device of claim 1, in which
the message received in the second packet signaling protocol is received from a first device, and
the reply message to the message received from the first device is sent to a second device different from the first device.

5. The device of claim 1, in which the processor is further adapted to:
decode from the response message also an alternate network address corresponding to an alternate network device associated with the gatekeeper, and
in which the reply message further contains the alternate network address.

6. A device comprising:
a network interface for coupling an H.323 network device to a Session Initiation Protocol (SIP) network; and
a processor coupled with the network interface, in which the processor is adapted to
receive and analyze a H.323 request message from the H.323 network device to initiate communications with the SIP network;
convert the analyzed H.323 request message to a SIP location request message; and
transmit the SIP location request message to a SIP gatekeepers
receive a SIP response message responsive to the transmitted SIP location request message;
decode from the SIP response message a primary network address corresponding to a primary network device associated with the gatekeeper;
convert the SIP response message to an H.323 reply message; and
send the H.323 reply message to the H.323 request message that contains the primary network address.

7. The device of claim 6, in which
the H.323 request message is an Abstract Syntax Notation One (ASN.1) encoded Registration, Admission, Status (RAS) Location Request (LRQ) message.

8. The device of claim 6, in which
the gatekeeper is preconfigured, and
the SIP location request message is transmitted over a User Datagram Protocol (UDP) socket.

9. The device of claim 6, in which the processor is further adapted to:
decode from the SIP response message also an alternate network address corresponding to an alternate network device associated with the gatekeeper, and
in which the H.323 reply message to the H.323 request message further contains the alternate network address.

10. A device comprising:
means for receiving and analyzing a message to initiate communications from a network device using a second packet signaling protocol with a network using a first packet signaling protocol;
means for converting the message received in the second packet signaling protocol to a message in the first packet signaling protocol;
means for transmitting the message converted to the first packet signaling protocol to a network gatekeeper;
means for receiving a response message in the first packet signaling protocol responsive to the message converted to the first packet signaling protocol;

means for decoding from the response message in the first packet signaling protocol a primary network address corresponding to a primary network device associated with the gatekeeper;

means for converting the response message received in the first packet signaling protocol to a reply message in the second packet signaling protocol; and means for sending the reply message in the second packet signaling protocol that contains the primary network address.

11. The device of claim 10, wherein the first packet signaling protocol comprises H.323 protocol, the second packet signaling protocol comprises Session Initiation Protocol (SIP), the message received in the second packet signaling protocol comprises a SIP invite message to initiate communications with a network device associated with the gatekeeper, and the message in the first packet signaling protocol comprises an H.323 request message.

12. The device of claim 10, wherein the first packet signaling protocol comprises SIP, the second packet signaling protocol comprises H.323 protocol, the message received in the second packet signaling protocol comprises an H.323 request message to initiate communications with a network device associated with the gatekeeper, and the message in the first packet signaling protocol comprises a SIP invite message.

13. The device of claim 10, in which the message received in the second packet signaling protocol is received from a first device, and the reply message received from the first device is sent to a second device different from the first device.

14. The device of claim 10, further comprising:

means for decoding from the response message also an alternate network address corresponding to an alternate network device associated with the gatekeeper, and in which the reply message further contains the alternate network address.

15. A device comprising:

means for receiving and analyzing a H.323 request message to initiate communications with a network using Session Initiation Protocol (SIP);

means for converting the analyzed H.323 request message to a SIP location request message;

means for transmitting the SIP location request message to a SIP gatekeeper;

means for receiving a SIP response message responsive to the transmitted SIP location request message;

means for decoding from the SIP response message a primary network address corresponding to a primary network device associated with the gatekeeper;

means for converting the SIP response message to an H.323 reply message; and means for sending the H.323 reply message to the H.323 request message that contains the primary network address.

16. The device of claim 15, in which the H.323 request message is a ASN.1 encoded RAS LRQ message.

17. The device of claim 15, in which the gatekeeper is preconfigured, and the SIP location request message is transmitted over a UDP socket.

18. The device of claim 15, further comprising:

means for decoding from the SIP response message also an alternate network address corresponding to an alternate network device associated with the gatekeeper, and in which the H.323 reply message to the H.323 request message further contains the alternate network address.

19. An article comprising: a storage medium, the storage medium having instructions stored thereon, in which when the instructions are executed by at least one device, they result in:

receiving and analyzing a message to initiate communications from a network device using a second packet signaling protocol with a network using a first packet signaling protocol;

converting message received in the second packet signaling protocol to a message in the first packet signaling protocol;

transmitting the message in the first packet signaling protocol to a network gatekeeper;

receiving a response message in the first packet signaling protocol responsive to the message transmitted in the first packet signaling protocol to the network gateway;

decoding from the response message a primary network address corresponding to a primary network device associated with the gatekeeper;

converting the response message received in the first packet signaling protocol to a reply message in the second packet signaling protocol; and sending the reply message in the second packet signaling protocol that contains the primary network address.

20. The article of claim 19, wherein the first packet signaling protocol comprises H.323 protocol;

the second packet signaling protocol comprises SIP;

the message received in the second packet signaling protocol comprises a SIP invite message to initiate communications with a network device associated with the gatekeeper; and the message in the first packet signaling protocol comprises an H.323 request message.

21. The article of claim 19, wherein the first packet signaling protocol comprises SIP, the second packet signaling protocol comprises H.323 protocol, the message received in the second packet signaling protocol comprises an H.323 request message to initiate communications with a network device associated with the gatekeeper, and the message in the first packet signaling protocol comprises a SIP invite message.

22. The article of claim 19, in which the message received in the second packet signaling protocol is received from a first device, and the reply message to the message received from the first device is sent to a second device different from the first device.

23. The article of claim 19, in which the instructions further result in:

decoding from the response message also an alternate network address corresponding to an alternate network device associated with the gatekeeper, and in which the reply message further contains the alternate network address.

24. An article comprising: a storage medium, the storage medium having instructions stored thereon, in which when the instructions are executed by at least one device, they result in:
- receiving and analyzing a H.323 request message to initiate communications with a network using Session Initiation Protocol (SIP);
- converting the analyzed H.323 request message to a SIP location request message;
- transmitting the SIP location request message to a SIP gatekeeper;
- receiving a SIP response message responsive to the transmitted SIP location request message;
- decoding from the SIP response message a primary network address corresponding to a primary network device associated with the gatekeeper;
- converting the SIP response message to an H.323 reply message; and
- sending the H.323 reply message to the H.323 request message that contains the primary network address.

25. The article of claim 24, in which the H.323 request message is a ASN.1 encoded RAS LRQ message.

26. The article of claim 24, in which
- the gatekeeper is preconfigured, and
- the SIP location request message is transmitted over a UDP socket.

27. The article of claim 24, in which the instructions further result in:
- decoding from the SIP response message also an alternate network address corresponding to an alternate network device associated with the gatekeeper, and
- in which the H.323 reply message to the H.323 request message further contains the alternate network address.

28. A method comprising:
- receiving and analyzing a message to initiate communications using a second packet signaling protocol with a network using a first packet signaling protocol;
- converting the message received in the second packet signaling protocol to a message in the first packet signaling protocol;
- transmitting the message in the first packet signaling protocol to a network gatekeeper;
- receiving a response message in the first packet signaling protocol responsive to the message transmitted in the first packet signaling protocol to the network gatekeeper;
- decoding from the response message a primary network address corresponding to a primary network device associated with the gatekeeper;
- converting the response message received in the first packet signaling protocol to a reply message in the second packet signaling protocol; and
- sending the reply message in the second packet signaling protocol that contains the primary network address.

29. The method of claim 28, wherein
- the first packet signaling protocol comprises H.323 protocol,
- the second packet signaling protocol comprises Session Initiation Protocol (SIP),
- the message received in the second packet signaling protocol comprises a SIP invite message to initiate communications with a network device associated with the gatekeeper, and
- the message in the first packet signaling protocol comprises an H.323 request message.

30. The method of claim 28, wherein
- the first packet signaling protocol comprises SIP,
- the second packet signaling protocol comprises H.323 protocol,
- the message received in the second packet signaling protocol comprises an H.323 request message to initiate communications with a network device associated with the gatekeeper, and
- the message in the first packet signaling protocol comprises a SIP invite message.

31. The method of claim 28, in which
- the message received in the second packet signaling protocol is received from a first device, and
- the reply message to the message received from the first device is sent to a second device different from the first device.

32. The method of claim 28, further comprising:
- decoding from the response message also an alternate network address corresponding to an alternate network device associated with the gatekeeper, and
- in which the reply message further contains the alternate network address.

33. A method comprising:
- receiving and analyzing a H.323 request message to initiate communications with a network using Session Initiation Protocol;
- converting the analyzed H.323 request message to a SIP location request message;
- transmitting the converted SIP location request message to a SIP gatekeeper;
- receiving a SIP response message responsive to the transmitted SIP location request message;
- decoding from the SIP response message a primary network address corresponding to a primary network device associated with the gatekeeper;
- converting the SIP response message to an H.323 reply message; and
- sending the H.323 reply message to the H.323 request message that contains the primary network address.

34. The method of claim 33, in which the H.323 request message is a ASN.1 encoded RAS LRQ message.

35. The method of claim 33, in which
- the gatekeeper is preconfigured, and
- the SIP location request message is transmitted over a UDP socket.

36. The method of claim 33, further comprising:
- decoding from the SIP response message also an alternate network address corresponding to an alternate network device associated with the gatekeeper, and
- in which the H.323 reply message to the H.323 request message further contains the alternate network address.

* * * * *